F. MATOUSHEK.
CULTIVATOR.
APPLICATION FILED MAY 17, 1918.
1,300,442.
Patented Apr. 15, 1919.
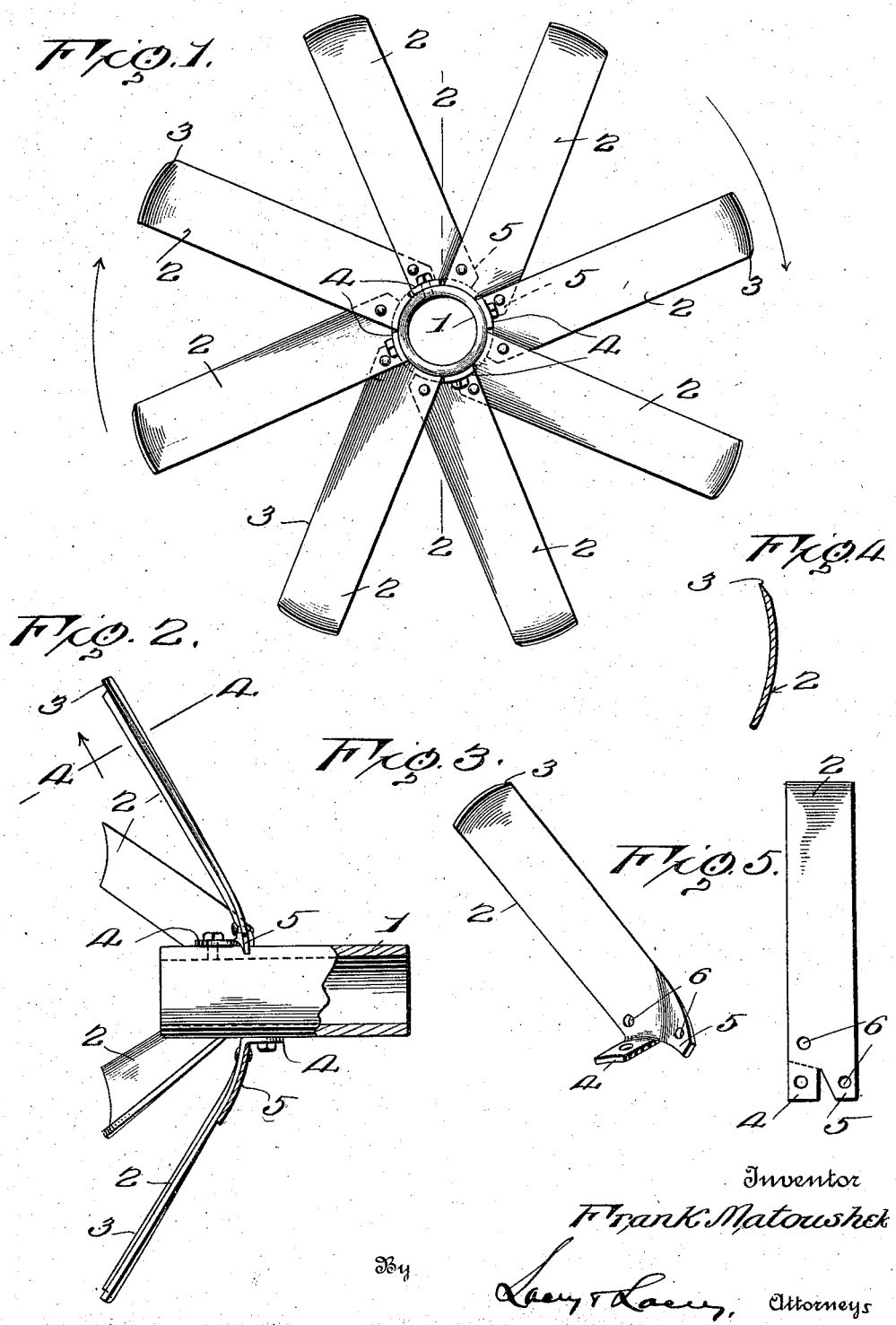

UNITED STATES PATENT OFFICE.

FRANK MATOUSHEK, OF COLOME, SOUTH DAKOTA.

CULTIVATOR.

1,300,442.   Specification of Letters Patent.   Patented Apr. 15, 1919.

Application filed May 17, 1918.   Serial No. 235,158.

*To all whom it may concern:*

Be it known that I, FRANK MATOUSHEK, a citizen of the United States, residing at Colome, in the county of Tripp, and State of South Dakota, have invented certain new and useful Improvements in Cultivators, of which the following is a specification.

My invention relates to cultivators and has special reference to the blade or member which penetrates the ground. The object of the invention is to provide a ground-engaging member which may be easily repaired, which may be produced at a slight cost and which will cut the desired swath without excessive strain upon the frame of the machine or the mechanism which directly operates the blade. My present invention is intended more particularly for application to the motor cultivator disclosed in Letters-Patent No. 1,210,511, granted to me January 2, 1917, but it is, of course, applicable to cultivators of other types.

The invention is illustrated in the accompanying drawings and consists in certain novel features which will be first fully described and then more particularly pointed out in the appended claim.

In the drawings:

Figure 1 is an elevation of my improved cultivator blade;

Fig. 2 is a vertical section on the line 2—2 of Fig. 1;

Fig. 3 is a detail perspective view of a blade;

Fig. 4 is a transverse section of the blade;

Fig. 5 is a view of the blank for the blade.

Referring more particularly to the drawings by reference numerals, 1 designates a shaft which is mounted in suitable bearings upon the cultivator frame and is to be positively rotated by gearing connected with a motor upon the frame or with ground wheels which support the cultivator frame. To the shaft 1, I secure a plurality of blades or cutters 2 each of which consists of a substantially oblong plate having one edge sharpened so as to readily cut through the earth, as indicated at 3. The blades are secured to the shaft with their median lines offset from the respective radii of the same, as best shown in Fig. 1, and the outer free ends of the blades are spaced, as shown in said figure. At their inner ends the several blades are provided with laterally projecting tongues 4, which are adapted to fit closely to the peripheral surface of the shaft 1 and are secured thereto by bolts or similar fastenings inserted through the tongue into the shaft as will be readily understood. The tongues are of less width than the blades so that a corner 5 of each blade is left to overlap the preceding blade, as will be readily understood on reference to Figs. 1 and 3, and in order to permit the overlapping of the blades, the tongues of alternate blades extend in opposite directions. Bolt holes 6 are provided in the inner end of each blade immediately over the tongue of the same and in the projecting corner 5 so that the overlapping portions of the blades may be secured together.

It is thought the operation of the device will be readily understood. As the cultivator travels over the field, the several cutters are rotated so that the cutting edges of the respective blades are brought successively into contact with the ground and will cut through the same. The blades are secured to the shaft firmly so that they will not be easily detached through accident, but inasmuch as the outer ends of the several blades are free they may yield to large stones and pass around the same without being broken or having their edges excessively dulled. Inasmuch as the blades are not secured radially to the shaft, the cutting edges will move gradually into contact with the ground and will consequently very readily and easily penetrate and pass through the same. This inclination of the blade will also permit uncut roots to readily slide off the cutting edge toward the free end of the blade. The blades are straight longitudinally and disposed at such an angle to the axis of the shaft that they will act through the entire distance between the sets or groups of blades on the shaft. The blades are curved or dished transversely so that the soil will be thoroughly turned and pulverized and brought into the desired condition to promote the growth of plants. Should any one blade be broken or so bent as to become unserviceable, a new blade may be substituted therefor without requiring the provision of an entire set of blades and without consuming a great period of time. The device is obviously simple in its construction and may be produced at a low cost. When in use it will be found highly efficient for the purpose for which it is designed.

Having thus described my invention, what is claimed as new is:

In a cultivator, the combination of a shaft, and a plurality of blades disposed about the shaft, the inner ends of the blades being provided with laterally projecting tongues extending in opposite directions on alternate blades and fitting against and secured to the shaft, the said tongues being of less width than the blades and the forward inner corner of each blade overlapping and being secured to the blade preceding it.

In testimony whereof I affix my signature.

FRANK MATOUSHEK.